Harley H. Williams
INVENTOR.

BY Murray Robinson
ATTORNEY

United States Patent Office 3,517,208
Patented June 23, 1970

3,517,208
FREQUENCY REGULATION FOR A TURBOGENERATOR
Harley H. Williams, Houston, and Charles L. Bundick, Deer Park, Tex., assignors, by mesne assignments, to Powell Magnetic Industries, Inc., Houston, Tex., a corporation of Texas
Filed Sept. 1, 1967, Ser. No. 665,115
Int. Cl. H02p 9/04
U.S. Cl. 290—40      12 Claims

ABSTRACT OF THE DISCLOSURE

A gas turbine is driven by natural gas from a well, the turbine being in parallel with a choke in the gas flow line providing a pressure drop to actuate the turbine. The turbine drives an alternator whose frequency, e.g. 60 c.p.s., is closely regulated, e.g. to within one c.p.s. A frequency to current converter connected to the alternator produces a current output in a range, e.g. 4 to 20 ma. proportional to input, over a band of frequency, e.g. 50 to 70 c.p.s. A current to pressure transducer connected to the converter produces a gas pressure output in a range, e.g. 3 to 15 p.s.i. proportional to the current input. A pneumatic controller connected to the transducer produces a fixed output if the input pressure is at a preselected set value; if the input pressure departs from the set pressure, depending on the direction of the departure the output pressure increases or decreases gradually and continuously as time progresses so long as the input differs from the set pressure. The controller output actuates a pneumatic powered adjustable throttle valve in the gas supply to the turbine, thereby governing its speed and the alternaor frequency.

CROSS REFERENCE TO RELATED APPLICATIONS

This application discloses and claims an invention useful in connection with the turbogenerator disclosed in U.S. Pat. No. 3,140,855, issued July 14, 1964, on the application of Harley H. Williams and Robert V. Beason.

BACKGROUND OF THE INVENTION

Field of the invention

The present invention relates to governors, more particularly to frequency governors for turboalternators. The invention is specially adapted for use with turbines having a large acceleration in response to a change in load. The back pressure turbine shown in U.S. Pat. No. 3,140,855 has such a characteristic.

Description of the prior art

It is known to govern the speed of a turbine by varying the drive fluid by means of a motor valve controlled in response to the frequency of the electric output of an alternator driven by the turbine. Examples of such constructions are shown in U.S. Pats. Nos. 1,959,298; 2,031,753; 2,021,754; 2,729,751; 2,772,378; 2,866,150; 2,909,672; 3,253,211.

SUMMARY OF THE INVENTION

The present invention has for its object the provision of a frequency governor which with infrequent maintenance will reliably maintain the frequency of a 2 kw. 60 c.p.s. alternator within 1 c.p.s. of the desired frequency despite substantially instantaneous change in load from full load to zero and vice versa, the alternator being driven by a back pressure turbine connected across a choke in the flow line from an offshore gas well. Such a turbine left unregulated can accelerate from its normal speed of 3600 r.p.m. to 10,000 r.p.m. in a matter of a few seconds or less; therefore the governor response must be very fast. The response required to compensate for a large change in load must also be very large, e.g. upon substantially complete loss of load turbine gas throttle should be substantially completely closed; however unless the governor includes a load responsive means or an acceleration responsive means, it has no way of knowing if a given change of speed and frequency is the result of a small or large change in load and the governor's response is likely to be greater or lesser in magnitude than that which is necessary to correct the turbine speed. According to the present invntion, the governor's response is a function not only of the magnitude of the departure of the turbine speed or alternator frequency from the desired set value but is also a function of the time duration of such departure. By this means the response becomes greater the longer the departure persists as in the case of a departure due to a large change in load, but over response is avoided. At the same time rapid response is achieved by minimizing the mechanical inertia of the governor. In the latter connection for example, speed or frequency is measured electrically. An electric current which is a function of speed and of sufficient power to drive a current to pressure transducer is produced in perfect synchronism with the turbine speed.

Briefly, a frequency to current coverter fed from the alternator produces a direct current output which is fed to a current to gas pressure transducer. The pressure of the transducer is supplied to a pressure and time responsive controller whose pressure output is supplied to a motor valve serving as the turbine throttle. The controller is set to have an output only when its input pressure departs from a preset pressure corresponding to the desired frequency of the alternator. The time response of the controller is adjustable to prevent or minimize hunting under actual load conditions. The frequency to current converter has a substantially zero output below a certain frequency and the current to pressure transducer has a limited range of acceptable current input; the converter output is adjustable to match the transducer input range at the desired frequency of the alternator.

DESCRIPTION OF THE PREFERRED EMBODIMENT

Figure 1:
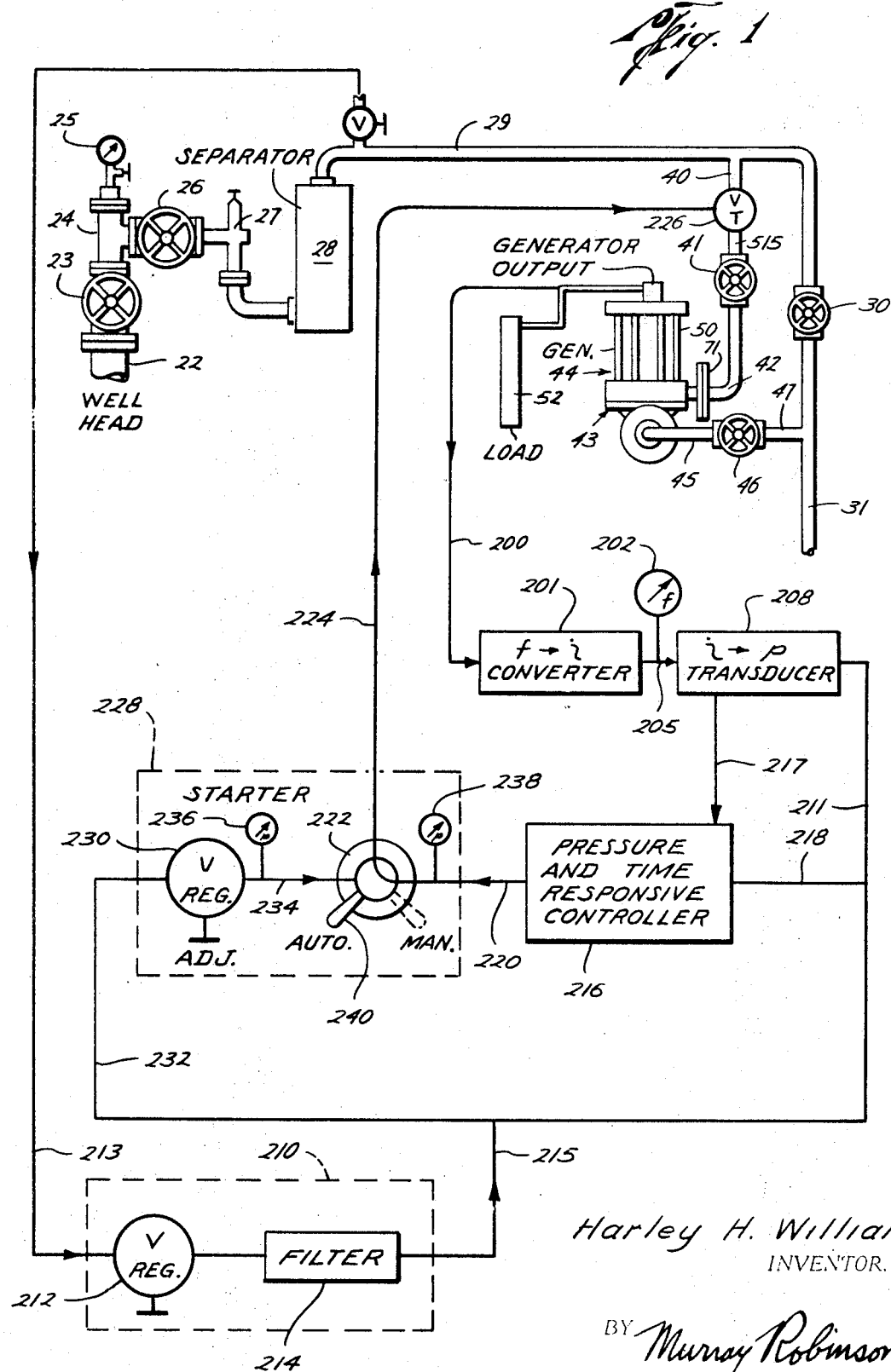
FIG. 1 is a schematic view of a governor embodying the invention connected to control the frequency of an alternator driven by a back pressure turbine connected across a choke in the flow line of a gas well.

Referring now to FIG. 1 there is shown a well head 22 at the upper end of a gas well (not shown). Master valve 23 on top of the well head controls flow from the well. A T 24 on top of the master valve connects to a pressure gauge 25 and a wing valve 26. An adjustable choke 27 is connected to the wing valve and the outlet of the choke is connected to separator 28. A gas line commencing with pipe 29 extends from the top of the separator to adjustable restricting valve or choke 30 and continues on with pipe 31 connected to the downstream side of the valve 30 and leading to the first compressor station of a gas transmission line.

Around the choke 30 extends a by-pass line including a pipe 40, cut off valve 41, pipe 42, the turbine 43 of turbogenerator 44, pipe 45, cut off valve 46 and pipe 47. The turbo generator 44 is preferably of the type disclosed in U.S. Pat. No. 3,140,855 issued July 14, 1964 on the application of Harley H. Williams et al.

Generator 50 of the turbogenerator is connected by a cable to the various equipment such as microwave radio transmitter and receiver, remote metering and control apparatus, and cathodic protection system, which together constitute the generator load, designated schematically at 52.

The generator is also connected by cable 200 to frequency to current converter 201. A galvanometer 202 connected to the output of converter 201 is calibrated to read in frequency, thereby to indicate the frequency of the alternator.

The converter 201 is connected through cable 205 to the input of current to pressure transducer 208 which is supplied with gas from gas supply 210 through pipe 211. The supply 210 includes a pressure regulating valve 212 connected to the separator 28 by pipe 213. Supply 210 further includes a filter 214 connected between the regulator 212 and the gas supply outlet pipe 215.

The converter 201 is connected to the input of pressure and time responsive controller 216 through pipe 217. The controller is supplied with gas from gas supply 210 through pipe 218.

The output gas from controller 216 is fed through pipe 220, three way valve 222, and pipe 224 to motor valve 226, which is connected in gas pipe 40 and serves as a throttle valve for the turbine 43.

The three way valve 222 is part of a starter 228 which also includes an adjustable pressure regulating valve 230 connected to the gas supply 210 by pipe 232 and to the three way valve 222 by pipe 234. A pressure gauge 236 indicates the pressure in pipe 234 leading from the pressure regulator. A pressure gauge 238 indicates the pressure in pipe 220 leading from the controller. By means of handle 240 the three way valve may be shifted back and forth from the "automatic" position shown in which the controller is connected to the turbine throttle valve and the manual position indicated in broken lines in which the controller is closed off and the pressure regulator, instead of being closed off as shown, is connected to the throttle valve.

To start the turbogenerator, the three-way valve is turned to the manual position. Pressure regulator 230 is adjusted until the turbine is driving the alternator at the desired speed as indicated by frequency meter 202, e.g. 3600 r.p.m. or 60 c.p.s. Then a switch (not shown) provided in the cable connecting the load to the alternator is closed to connect the load to the alternator and the pressure regulator 230 is readjusted to bring the alternator frequency back up to 60 c.p.s. The set output pressure of controller 216 is then adjusted to equal that of the regulator as shown by gauge 236, and the three way valve is turned from the manual to the automatic position.

Thereafter, upon a change in turbine speed there will be a departure of the output pressure of the transducer from that required to balance the controller. That will cause the controller output pressure to increase (or decrease) from its set value, the amount of change in the controller output pressure increasing with time. Meanwhile, the change in output pressure of the controller will cause the turbine throttle valve 226 to open (or close) tending to restore the turbine to the desired speed. Upon return of the turbine to the prescribed speed, the controller pressure will return to its set pressure.

It is to be observed that if the change in turbine speed is due to a change in the electrical or other load, the setting of the throttle valve to maintain desired speed at the different load will be different from the original throttle valve setting. Therefore, the set output pressure of the controller will no longer correspond to that required to produce the prescribed turbine speed and the controller and throttle valve can not achieve a static balance. This causes the controller always to be in a dynamic condition and results in prompt effective governing action.

Figure 2:
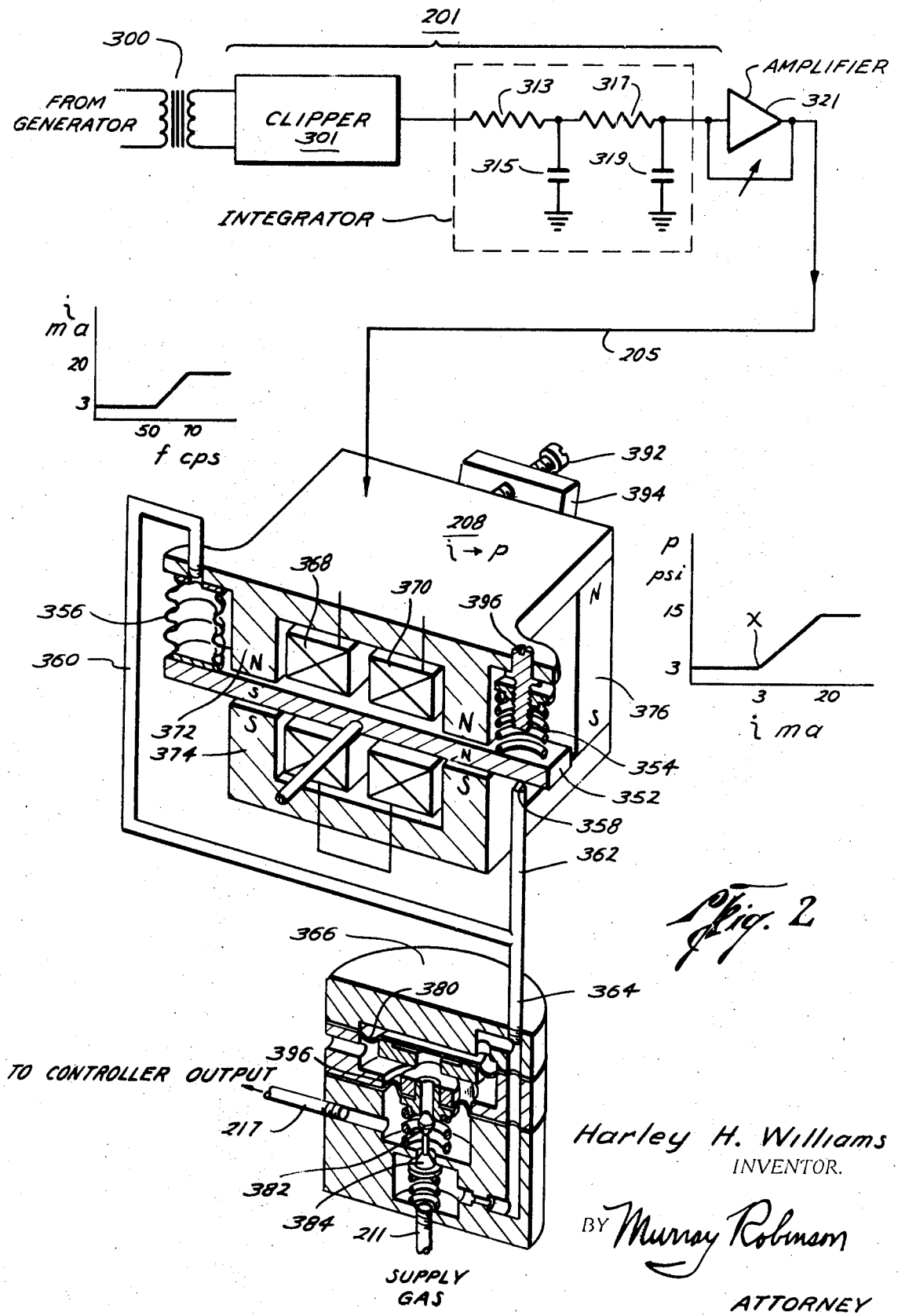
FIG. 2 is a partially schematic, partially pictorial view of the frequency to current converter and the current to pressure transducer components of the governor shown in FIG. 1.

Referring now to FIG. 2, the frequency to current converter 201 is a device available commercially from Omnitronix, Inc. of Houston, Tex., as a TA201 and is disclosed in detail in their drawing number C-11088 to which reference may be made for details of its construction. Briefly, converter 201 comprises an iron core transformer 300 whose primary is connected to the alternator output. The secondary of the transformer is connected to a clipper circuit 301.

The output of the clipper circuit is a series of square pulses of equal amplitude independent of the alternator voltage and of a frequency corresponding to the alternator frequency.

The pulses from clipper 301 are fed to an integrator or storage circuit comprising resistor 313, capacitor 315, resistor 317, and capacitor 319. If the pulse frequency is high enough relative to the capacity of capacitors 315, 319, the voltage on the capacitor 319 will build up in proportion to the frequency. The resultant voltage is amplified by multistage transistor amplifier 321. By adjusting the positive and negative feed backs in amplifier 321, the amplitude and range of the output of the amplifier 321 can be matched to the input requirements of current to pressure transducer 208. The output of the converter is a more or less linear function of the input as indicated in the diagram at the left of FIG. 2.

Transducer 208 is a known device and is available from Fisher Governor Company as a type 546 electro-pneumatic transducer and is described in Fisher's printed form 1783 (5M-5-65) to which reference may be made for details of its construction and operation. Briefly, a pivotally mounted soft iron or equivalent armature 352 is held at rest by the balanced torques produced by helical spring 354 acting in one direction and by bellows 356 and nozzle 358 acting in the opposite direction. The bellows and nozzle are supplied with gas under pressure through pipes 360 and 362 from pipe 364 connected to relay valve 366. Current from the output of converter 201 flows in coils 368, 370 polarizing armature 352 as shown. The armature is mounted between pole pieces 372, 374 connected to permanent magnet 376. When current changes in coils 368, 370, the balance of the armature is upset causing it to move closer to or away from nozzle 358. The resultant pressure change on top of upper diaphragm 380 changes the position of valve closures 382, 384, thereby changing the transducer output pressure in pipe 217 by throttling the gas supplied through pipe 211 from main supply 210 (FIG. 1). At the same time the pressure below lower bellows 390 of the relay 366 is throttled restoring the relay balance at the new output pressure. The output pressure of the transducer 208 is a more or less linear function of the input current in the range indicated in the diagram at the right of FIG. 2. The span of the output of transducer 208 is adjusted by means of set screw 392 which adjusts the position of magnetic shunt 394. By adjusting screw 392 the factor of proportionality of the transducer is changed so that a given change of current produces a greater or lesser change in pressure. By adjusting set screw 396 one can change the zero point of the transducer, that is, one can shift the minimum value of current required to cause an increase in the output of the transducer (point x in the diagram).

Figure 3:
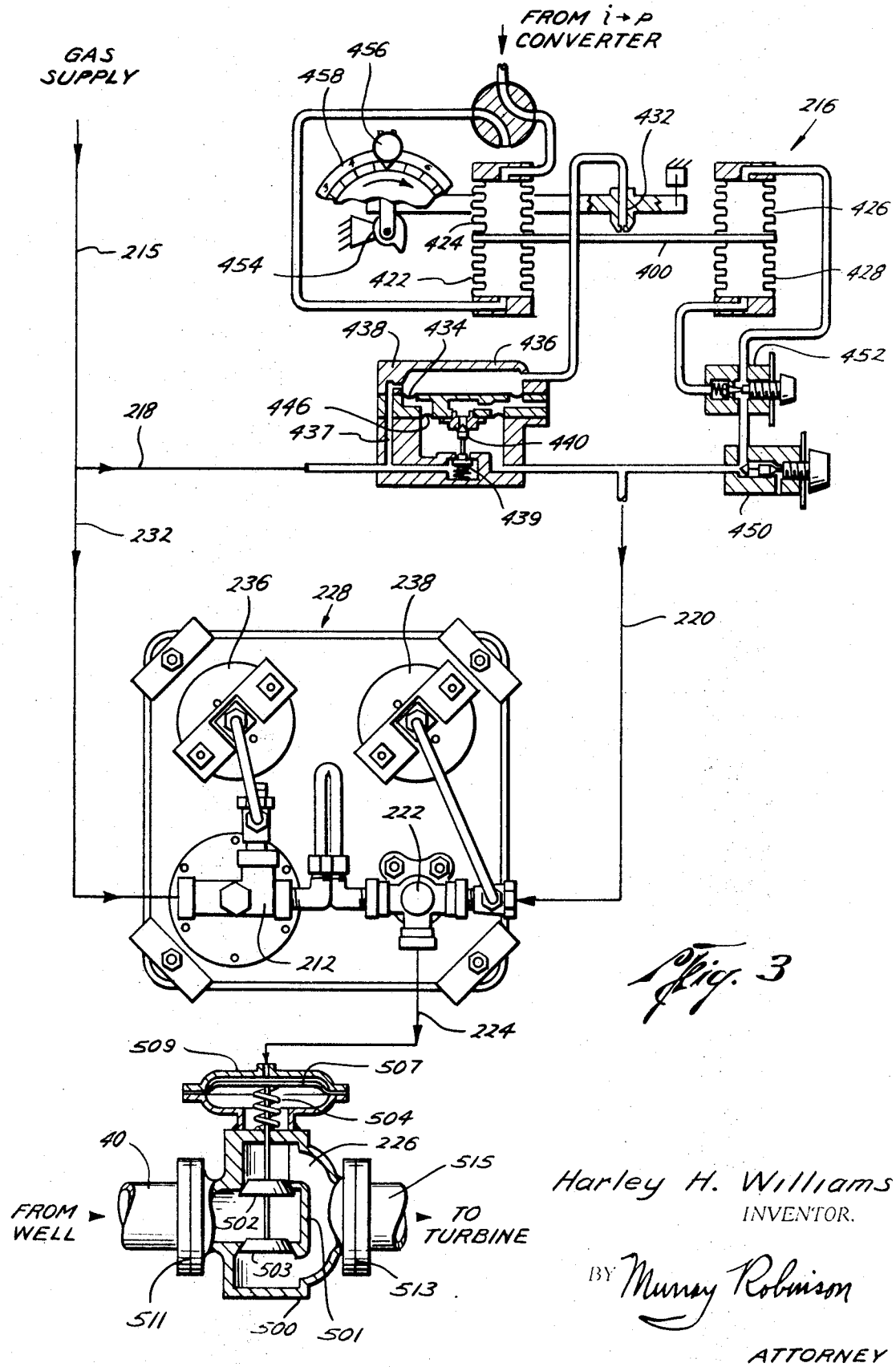
FIG. 3 is a partially schematic and partially pictorial view of the pressure and time responsive controller, the turbine throttle valve, and the starter unit of the governor and associated apparatus shown in FIG. 1.

Referring now to FIG. 3 there is shown the controller 216. The controller is of known construction and is available commercially from Fisher Governor Company as a type 2516 remote receiver controller. Such a controller is described in Fisher's Form 1041C (4M-2-65) to which reference may be made for a detailed description.

Briefly, the controller includes a bar 400 supported solely between a plurality of elastic bellows 422, 424, 426, 428. Bellows 424 is connected to the output of the transducer 208 so that change in transducer pressure moves the bar relative to nozzle 432, thereby changing the gas pressure above upper diaphragm 434 of relay 436, the chamber above the diaphragm being supplied with gas from pipe 437 through orifice 438. Movement of upper diaphragm 434 changes the position of main and pilot valve closures 439, 440. Variation of position of main closure 438 varies the controller output pressure in pipe 220 by throttling the gas from main gas supply 210 (FIG. 1) coming in through supply pipe 218. Variation in position of pilot valve closure 440 changes the pressure under lower diaphragm 446 of relay 436, tending to bring the relay back into balance at the new output and input pressure.

Increase of transducer output pressure moves bar 400 away from nozzle 432 to cause a drop in controller output pressure. Drop in transducer output pressure tends to cause an increase in controller output pressure.

Change in controller output pressure is immediately transmitted through adjustable bleed valve 450 to feedback bellows 426 tending to bring the bar back to a position of balance at the new controller output pressure. However the output pressure change is also gradually transmitted through adjustable choke 452 to reset bellows 428 which again unbalances the bar causing a further change in controller output pressure. The controller output pressure thus gradually departs more and more from its original pressure. This continues until the input pressure from the transducer returns to the original value causing the converter output pressure to return to its original value or set point. The static balance of the bar 400 is adjustable by means of cam 454 moved by lever 456, the scale 458 being calibrated to indicate the corresponding output pressure of the converter. The pressure amplification which takes place in the controller is adjustable by means of bleeder valve 450. The reset rate or time-pressure characteristic of the controller is adjusted by means of choke 452.

The output pipe 220 of the controller is connected to starter 228. In FIG. 3 the starter 228 appears as the unit is viewed from the rear. This unit is of known construction and is available commercially from Fisher Governor Company as their series 670 loading regulator and described in detail in their form 965A (5M–3–60).

Briefly, the starter includes three way valve 222 to which is connected controller output pipe 220. The gauge 238 indicates the pressure in pipe 220. Adjustable pressure regulating valve 212 is fed from gas pipe 232 and its output pressure is indicated on gauge 236. The starter output pipe 224 is connected to motor throttle valve 226. The valve 226 is of known construction and is available from Fisher Governor Company as a Fisher main valve. One type of Fisher main valve is disclosed in said Fisher form 965A. The valve 226 is a modification including a body 500, valve seats 501, balanced valve closures 502, 503, spring 504 urging the valve to closed position, and flexible diaphragm 507 subject to pressure in chamber 509 tending to open the valve. The starter output pipe 224 is connected to diaphragm chamber 509. The inlet 511 of valve 226 is connected to pipe 40 leading from the separator 28 (FIG. 1) and the outlet 513 of valve 226 is connected to pipe 515 leading to master valve 41 (FIG. 1) which is connected to the inlet of turbine 43.

From the foregoing description of the overall system and its component parts it is believed that the operation will be clear. To recapitulate, the turbine is brought up to speed with the starter, the controller set point is adjusted so that controller output pressure equals the starter pressure, and the starter three way valve is turned to "automatic." Thereafter the controller maintains the frequency of the generator within about one cycle per second (c.p.s.) of the set 60 c.p.s. frequency. Since the controller is always in operation the response is rapid. By adjustment of the controller reset rate, which may repeat as often as 50 or 100 times a minute, the stability of the system is controlled. The electronic frequency to current converter is rapid and definite in its response. The current to pressure transducer is simple and reliable and of low inertia. The starter provides a simple means of bringing the system up to speed prior to automatic operation.

While a preferred embodiment of the invention has been shown and described, many modifications thereof can be made by one skilled in the art without departing from the spirit of the invention.

What is claimed is:

1. A frequency regulator for a turbogenerator comprising
   first means having an input and an output for producing a fluid pressure in the output that is a continuous function of the frequency of the electric current in the input throughout a range of frequencies, said output pressure changing whenever the input frequency changes at all frequencies within said range, said input being connectable to the electric output of such generator, and
   controller means for governing the degree of opening of a motor throttle valve connected to the fluid inlet of such turbine and including a fluid pressure input connected to the output of said first means and having a fluid pressure output connectable to such motor throttle valve,
   said regulator being distinguished by
   said controller means being responsive to departure of the fluid pressure at the inlet thereof from a preset value to produce a change in the fluid pressure in the outlet thereof that is a direct function of both the magnitude and duration of said departure, the greater said departure and the longer said departure the greater said change in said fluid pressure in the outlet.

2. Subject matter of claim 1 further distinguished by
   said first means including a frequency to current converter whose frequency input is the input of said first means and having an output whose current is a function directly proportional to the frequency of said frequency input over a range of frequencies and within said range is of constant sign,
   said first means further including a current to pressure transducer having a current input connected to said converter output and having a fluid pressure output which is the output of said first means and is a direct function of the current input to said transducer.

3. Subject matter of claim 2 further distinguished by
   said converter being entirely electronic and said transducer comprising means to balance a magnetic force against a fluid dynamic pressure, whereby inertia of the first means is minimal.

4. A frequency regulator for a turbogenerator comprising
   first means having an input and an output for producing a fluid pressure in the output that is a function of the frequency of the electric current in the input, said input being connectable to the electric output of such generator, and
   controller means for governing the degree of opening of a motor throttle valve connected to the fluid inlet of such turbine and including a fluid pressure input connected to the output of said first means and having a fluid pressure output connectable to such motor throttle valve,
   said regulator being distinguished by said controller means being responsive to departure of the fluid pressure at the inlet thereof from a preset value to produce a change in the fluid pressure in the outlet thereof that is a function of both the magnitude and duration of said departure,
   said first means including a frequency to current converter whose frequency input is the input of said first means and having an output whose current is a function of the frequency of said frequency input, said first means further including a current to pressure transducer having a current input connected to said converter output and having a fluid pressure output which is the output of said first means and is a function of the current input to said transducer, said converter being entirely electronic and said transducer comprising means to balance a magnetic force against a fluid dynamic pressure, whereby inertia of the first means is minimal, said converter including a clipper producing pulse whose magnitude and duration is independent of generator voltage but of a frequency proportional to generator frequency, and an integrator receiving said pulses and producing an output proportional to the pulse frequency.

5. Subject matter of claim 4 further distinguished by said controller including fluid pressure control means responsive to the balance of a fluid dynamic pressure and fluid static pressure.

6. Subject matter of claim 4 further distinguished by including a starter, said starter comprising auxiliary means for supplying fluid at adjustable output pressure to said motor throttle valve, and valve means for alternately connecting said motor throttle valve to said starter and said controller means.

7. Subject matter of claim 6 further distinguished by including means to indicate the frequency of said generator, means to indicate the output pressure of said auxiliary means, means to indicate the output pressure of said transducer, and means to adjust said preset value of the transducer output pressure, whereby said generator output can be brought to the desired frequency by varying the output pressure of said auxiliary means for supplying fluid pressure and thereafter the preset value of the transducer output can be adjusted to equal the output pressure of said auxiliary means and the valve means switched to connect to motor throttle valve to the controller output to maintain said desired frequency.

8. Subject matter of claim 4 wherein said frequency to current converter has substantially zero output below a predetermined frequency range and a substantially linear current to frequency characteristic within said range, said transducer having a fluid pressure output that is a substantially linear function of the current input thereteo within the current output range of said converter corresponding to said frequency input range.

9. Subject matter of claim 4 further distinguished by said controller means including means to adjust the time rate of change of controller output pressure, wherein the regulator operation may be stabilized when connected to a particular turbogenerator.

10. Subject matter of claim 9 further distinguished by said controller including means to adjust the magnitude of the controller output as a function of departure of input pressure from that corresponding to the preset output pressure, whereby regulator power may be adjusted to maintain frequency control within a desired range.

11. A frequency regulator for a turbogenerator comprising an electro-pneumatic transducer having a fluid pressure output that is a direct function of the electric current input, and a pneumatic controller having a fluid pressure input and a fluid pressure output, the controller input being connected to the transducer output, the controller including means responsive to departure of the fluid pressure at its inlet from a preset value to produce a change in the fluid pressure at its outlet which latter change is a direct function of both the magnitude and duration of said departure, the greater said departure and the longer said departure the greater said change in said fluid pressure in the outlet, said transducer input being connectable to means for generating a current that is a direct function of the turbine speed, sair controller output being connectable to means for controlling turbine speed.

12. Subject matter of claim 1 further distinguished by said transducer fluid being a gas and said transducer input current being direct current and the current to pressure transducer having a linear current to pressure characteristic over a range above a predetermined direct current input, the controller output having a basic linear change in output pressure to change in input pressure characteristic which linear characteristic is modified by superposition thereon of a linear function of output pressure change as a function of time.

References Cited

UNITED STATES PATENTS

| | | | |
|---|---|---|---|
| 2,917,636 | 12/1959 | Akeley | 290—40 X |
| 3,110,817 | 11/1963 | Frederick | 290—40 |
| 3,112,406 | 11/1963 | Avery | 290—40 |
| 3,143,656 | 8/1964 | Nichols | 290—40 |
| 3,234,396 | 2/1966 | Kubilos | 290—40 |
| 3,239,677 | 3/1966 | Dimitroff | 290—40 |
| 3,342,999 | 9/1967 | Townsend | 290—40 |
| 3,427,464 | 2/1969 | Watson | 290—40 |

GLEN SIMMONS, Primary Examiner

U.S. Cl. X.R.

290—52; 137—36.